United States Patent
Voisin et al.

(10) Patent No.: US 7,884,669 B2
(45) Date of Patent: Feb. 8, 2011

(54) BROADBAND AMPLIFYING DEVICE

(75) Inventors: Philippe Voisin, Toulouse (FR); Jacques Belmont, Tournefeuille (FR)

(73) Assignee: Thales, Neuilly-sur-Seine (FR)

( * ) Notice: Subject to any disclaimer, the term of this patent is extended or adjusted under 35 U.S.C. 154(b) by 0 days.

(21) Appl. No.: 12/376,819

(22) PCT Filed: Aug. 9, 2007

(86) PCT No.: PCT/EP2007/058256

§ 371 (c)(1),
(2), (4) Date: May 18, 2009

(87) PCT Pub. No.: WO2008/017699

PCT Pub. Date: Feb. 14, 2008

(65) Prior Publication Data

US 2009/0243719 A1 Oct. 1, 2009

(30) Foreign Application Priority Data

Aug. 10, 2006 (FR) .................................. 06 53344

(51) Int. Cl.
*H03F 3/68* (2006.01)
(52) U.S. Cl. .................................. 330/126; 330/124 R
(58) Field of Classification Search .................. 330/53, 330/54, 124 R, 126, 286, 295
See application file for complete search history.

(56) References Cited

U.S. PATENT DOCUMENTS

| 5,206,604 | A | * | 4/1993 | Vaninetti ................ 330/124 R |
| 5,428,814 | A |   | 6/1995 | Mort et al. |
| 6,006,111 | A | * | 12/1999 | Rowland ................ 330/124 R |
| 6,456,824 | B1 |   | 9/2002 | Butte et al. |
| 7,256,735 | B2 |   | 8/2007 | Hoffmann et al. |

FOREIGN PATENT DOCUMENTS

| EP | 0 584 012 A1 | 2/1994 |
| EP | 1 499 013 A1 | 1/2005 |
| FR | 2 783 378 A1 | 3/2000 |
| WO | WO 2006/060114 A1 | 6/2006 |

\* cited by examiner

*Primary Examiner*—Khanh V Nguyen
(74) *Attorney, Agent, or Firm*—Baker Hostetler LLP

(57) ABSTRACT

The present invention relates to an amplification device for a satellite in order to amplify a plurality of n transmission channels to an output corresponding to a beam, the device comprising:
  frequency band combining means comprising n inputs in order to receive the n transmission channels and q outputs in order to supply respectively the channels grouped together within q frequency bands,
  a power amplification unit including p active amplifiers in parallel for the distributed amplification of the n channels,
  gain and phase adjustment means corresponding to the p power amplifiers on the q frequency bands.

2 Claims, 3 Drawing Sheets

FIG_1
(Prior Art)
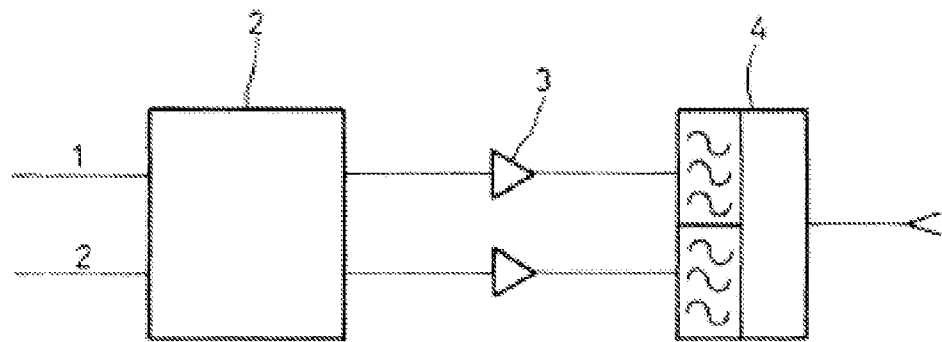
FIG_7
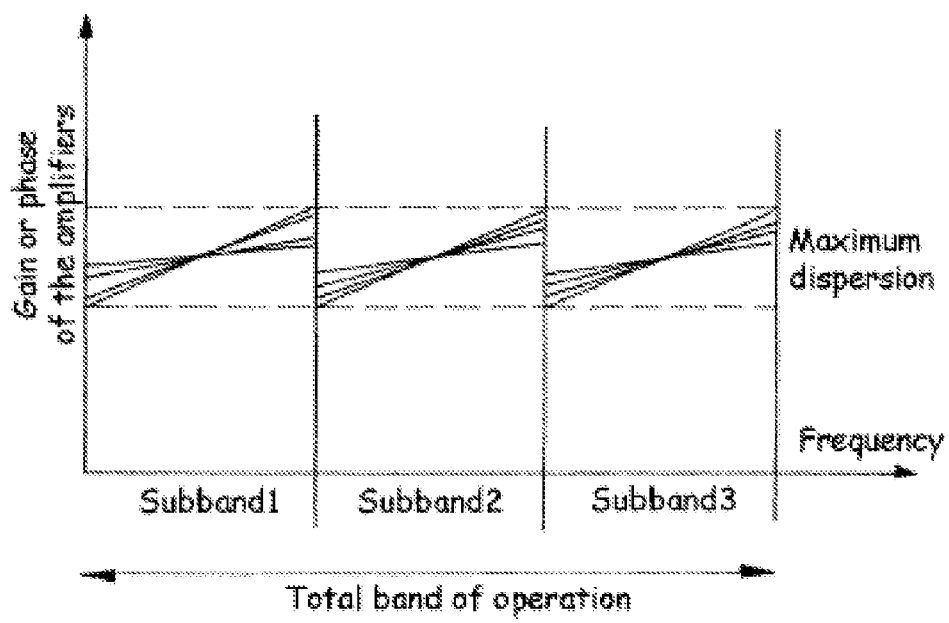

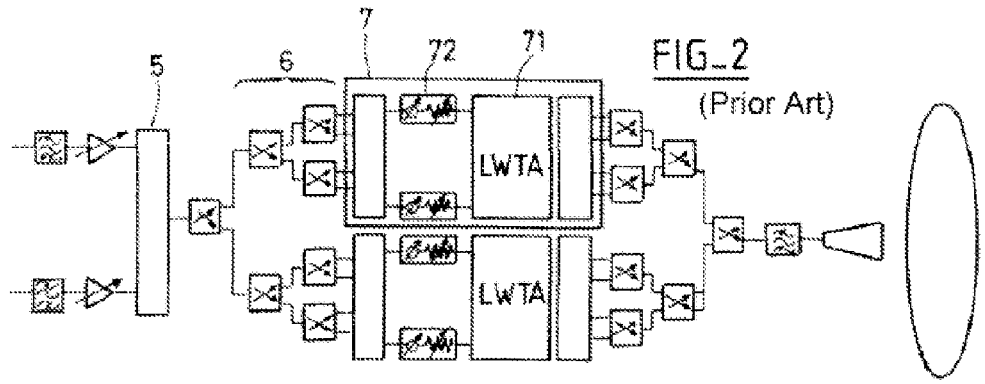
FIG_2 (Prior Art)
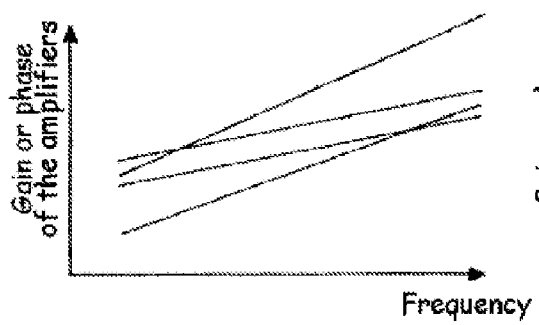
FIG_3
Amplitude or phase frequency response of the amplifiers before alignment
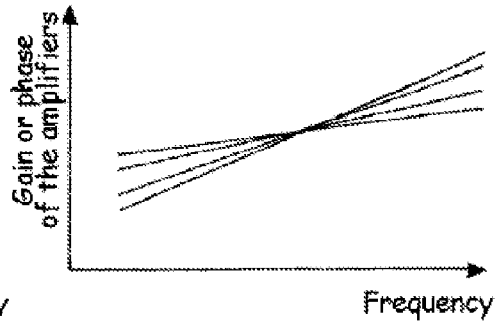
FIG_4
Amplitude or phase frequency response of the amplifiers after alignment
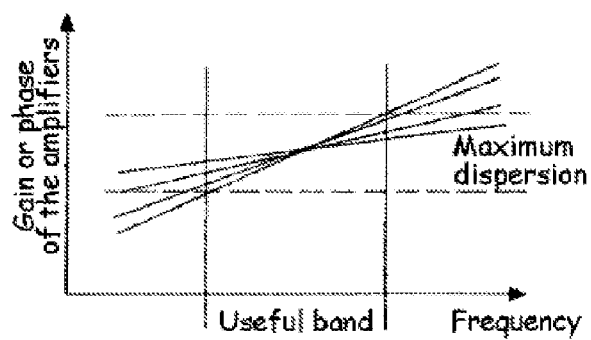
FIG_5

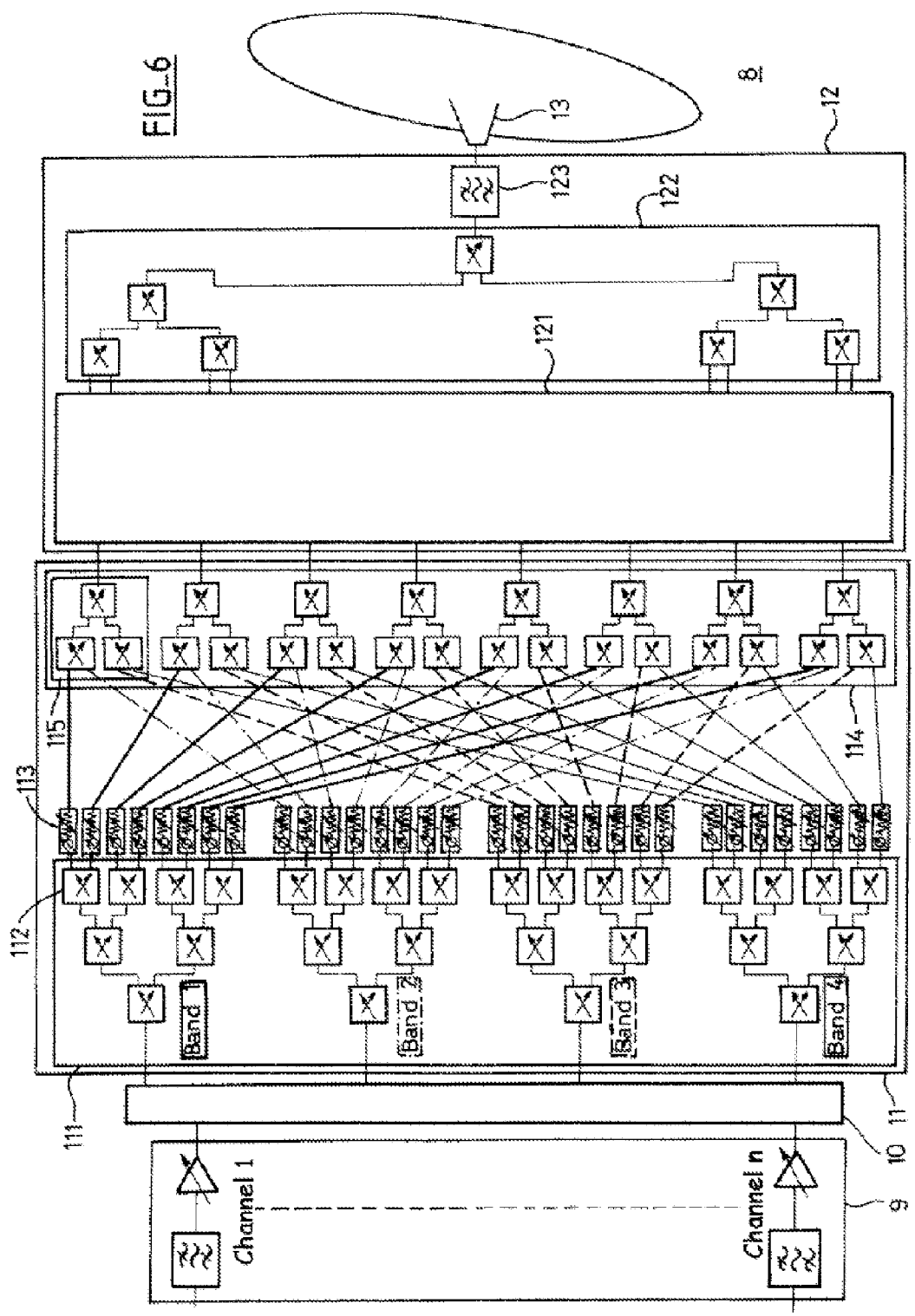

BROADBAND AMPLIFYING DEVICE

BACKGROUND OF THE INVENTION

The present invention relates to an amplification device for a satellite suitable for flexibly distributing a plurality of received transmission channels to an output beam signal.

In the usual space mission situation, the change in satellite transmissions to users equipped with transmit/receive terminals of reduced capacity and of small dimension requires an increase in the quality of reception of the onboard segment and an increase in the power of the signals retransmitted to the ground. These performance increases are obtained by increasing the onboard antenna gains, which can be achieved only by reducing the dimensions of their ground coverages. These coverage reductions require, in order to cover a particular geographic coverage zone on the ground, generating several beams or spots in order to sample the geographic zone. Such multibeam or multispot coverages make links with small ground terminals possible but they pose the problem of managing the onboard capacities and more particularly the allocation of the received channels to the transmitted beams according to:

the different traffic densities,
changes in traffic densities over time.

Therefore, in a known manner and as shown schematically in the architecture 1 of FIG. 1, a satellite receives two signals each corresponding to a transmission channel and supplies a beam at the output. The two channels are processed by one input section 2 which carries out:

a low-noise reception, an adequate frequency conversion and a filtering suitable for each of the two transmission channels,
a delivery of each of the two channels to an amplifier 3.

A transmission channel corresponds to a transmission frequency band and may correspond to a single carrier or a set of carriers or subchannels.

Each transmission channel is amplified by the amplifier 3 that is associated with it. The amplifiers 3 are high-power amplifiers and are usually produced by linearized traveling wave tubes or solid state amplifiers. In order to have several channels per beam, it is necessary to combine the channels through output multiplexers 4. The output multiplexer 4 (or OMUX) provided at the output of each amplifier, known to those skilled in the art, comprises filters and a common guide which is designed to combine the transmission channels after they have been amplified. In the situation of FIG. 1, the output multiplexer 4 receives two transmission channels and supplies one beam signal. The beam signal is then sent to a source not shown such as a horn which radiates to a reflector not shown for the formation of the beam. Therefore, such an architecture makes it possible to have two transmission channels per beam on the downlink.

However, this architecture is not flexible and combines channeled amplification (one amplifier per channel and recombination of the channels through the OMUX) with a passive antenna. This solution imposes a fixed frequency plan (which defines the OMUX solution) without the possibility of modification in orbit.

The operators do not always have very clear visibility of the future distribution of the traffic (and therefore of the power) on the coverages addressed and therefore need to have a certain flexibility making it possible to adapt during the lifetime of the satellite to the traffic needs resulting from demand and from the success of services in various geographic zones. It is therefore important to be able to route the transmission channels in a flexible manner to the beams, that is to say so that the total number of channels processed by the useful load can be distributed to the various beams in accordance with the traffic demand throughout the lifetime of the satellite. With respect to this, the architecture as shown in FIG. 1 does not allow any flexibility in terms of number of channels allocated per beam and requires a number of amplifiers that is imposed by the number of channels to be amplified. It is not possible, in the prior art as explained, to be able to generate any one channel in a possible set of channels or else to be able to vary the frequency plans during the lifetime of the satellite.

SUMMARY OF THE INVENTION

The latter constraint has forced the research teams of the Applicant to replace channeled amplification with distributed amplification in which all the amplifiers amplify all the channels.

According to this solution, the channels are combined before amplification; the amplification is common to all the channels and directly supplies the antenna. It is therefore no longer necessary to use OMUXs and therefore, by nature, the solution is compatible with the amplification of any frequency distribution of the channels (the only constraint being that the number of amplified channels is limited by the number of amplifiers put to use).

FIG. 2 illustrates the latter solution for placing the amplifiers in parallel.

The two received channels, after filtering and amplification, are first summed by a channel combiner 5. The resultant signal is divided in power by dividers 6 in order to supply all the active amplifiers 71 of the amplification blocks 7. There is the same number of divider outputs as active amplifiers contributing to the distributed amplification. In this instance, two times 4 active amplifiers are used, the number of amplifiers installed including redundancy in the event of failure (two times 6 inactive amplifiers installed, or 12 tubes for 8 active).

Phase-shifters and attenuators 72 for adjusting the "alignment" of the amplifiers in phase and in amplitude are placed in front of the amplifiers: there is therefore a single adjustment for each amplifier. The adjustment is typically carried out at the central frequency of the band to be treated, which limits the correction that can be made. FIGS. 3 and 4 illustrate the result of the correction between four tubes made according to this principle and the method of FIG. 2. FIG. 3 illustrates the frequency response in amplitude or phase of the amplifiers before alignment while FIG. 4 illustrates the frequency response in amplitude or phase of the amplifiers after alignment.

Although, in principle, distributed amplification solves the problem posed, in practice it poses the problem of placing the amplifiers in parallel on the total transmission band occupied by the channels: the alignment of the amplifiers must be efficient over a broad frequency band. Specifically, FIG. 5 illustrates the limitation in terms of bandwidth of the parallel placement performed in this way. The "acceptable" dispersion (a function of the resultant power loss) defines the resultant bandwidth.

The object of the present invention is therefore to provide a device for a satellite suitable for amplifying and flexibly distributing a plurality n of input transmission channels to an output corresponding to a beam, with an efficiency of the adjustment in amplitude and phase of the amplifiers over a broad frequency band.

Accordingly, the subject of the invention is an amplification device for a satellite in order to amplify a plurality of n transmission channels to an output corresponding to a beam, the device comprising:

frequency band combining means comprising n inputs in order to receive the n transmission channels and q outputs in order to supply respectively the channels grouped together within q frequency bands, power amplification means including p active amplifiers in parallel for the distributed amplification of the n channels, gain and phase adjustment means corresponding to the p power amplifiers on the q frequency bands.

Thanks to the invention, there are as many adjustments as there are frequency bands, making it possible to carry out a specific adjustment per frequency band. Since the adjustment is made at the central frequency of each frequency band, the final result is a broadband adjustment.

The advantage of the solution is that it allows an alignment between amplifiers over a broad frequency band, which makes it possible to use an architecture of amplifiers placed in parallel in multichannel applications, a solution which opens many possibilities for flexible useful loads.

Other features and advantages of the present invention will appear in the following description of embodiments of the invention given as an illustration and being in no way limiting.

BRIEF DESCRIPTION OF THE DRAWINGS

FIG. 1 represents schematically an architecture of amplification of transmission channels according to the prior art, FIG. 2 represents schematically a device for the amplification and flexible allocation of transmission channels by placing amplifiers in parallel according to the prior art, FIG. 3 illustrates the frequency response in amplitude or phase of the amplifiers of FIG. 2 before alignment, FIG. 4 illustrates the frequency response in amplitude or phase of the amplifiers of FIG. 2 after alignment, FIG. 5 illustrates the limitation in terms of bandwidth of the parallel placement thus performed in the prior art, FIG. 6 represents schematically an amplification device according to one embodiment of the invention, FIG. 7 represents schematically the frequency response in amplitude or phase of the amplifiers according to the embodiment of FIG. 6.

DETAILED DESCRIPTION

FIGS. 1, 2, 3, 4 and 5 have already been described with reference to the prior art.

FIG. 6 represents a device 8 suitable for amplifying and flexibly distributing n signals C1 (channel 1) to Cn (channel n) of input signals to an output signal corresponding to a beam.

The device 8 comprises:
an input section 9 with n inputs and n outputs,
a combiner 10 with n inputs and q outputs (q=4 in the present embodiment),
an amplifier amplitude/phase adjustment unit 11,
a block 12 for power amplification,
a transmission antenna 13.

The input section 9 receives the n uplink transmission channels C1 to Cn each corresponding to one transmission channel. The input section 9 then performs the following operations:
appropriate frequency conversion of each of the n transmission channels C1 to Cn, filtering, and gain control,
delivery of the n transmission channels to the respective n inputs of the frequency band combiner 10.

The combiner 10 comprises low level couplers (that is to say operating at very low power): the combiner adds together all the signals belonging to each of the q frequency bands and therefore delivers to each of its q outputs a set of channels belonging to the appropriate frequency band.

The output signals {Band1-Band4} of the combiner 10 which may therefore correspond to several transmission channel signals are then sent to the q inputs of the amplifier amplitude/phase adjustment unit 11.

The q=4 inputs of the unit 11 are first linked to a set 111 of dividers 112, the function of which is to divide the power of the signals {Band1-Band4}, hereinafter called frequency band signals, in order to be able to supply all the amplifiers. Therefore, in the present case of the presence of 8 active amplifiers, each frequency band signal {Band1-Band4} is divided into 8 frequency band signals leaving the set 111. Each of the 4*8 divided frequency band signals is received respectively by one phase-shifter/gain attenuator 113.

The distribution of the transmission channels in 4 frequency bands and the use of 8 active amplifiers has required the use of 32 phase-shifters/attenuators. More generally, it can be considered that the distribution of the transmission channels into q' frequency bands and the use of p' active amplifiers requires the use of q'*p' phase-shifters/attenuators.

The amplitude and phase adjustment for the alignment of the amplifiers is carried out for each subband and for each amplifier, that is 32 independent adjustments according to the embodiment of FIG. 6.

The 32 phase-shifters/attenuators are followed by a block 114 of 8 summers 115 of the 4 to 1 type. Each of the summers 115 comprises four inputs, each receiving respectively one output signal of a phase-shifter/attenuator corresponding to one specific frequency band signal. Each of the summers supplies at its output the combination of the four various frequency band signals being sent to one of the active power amplifiers of an amplification unit 121 explained below.

Each of the power amplifiers of the unit 121 is usually a linearized traveling wave tube amplifier (or LTWTA) but it may also be a solid state power amplifier (SSPA).

The amplifiers of the unit 121 are followed by a summer 122 of the 8 to 1 type, after which the output signal is filtered by a filter 123 and then sent to a source 13 which radiates for the formation of the beam.

FIG. 7 represents schematically the frequency response in amplitude or phase of the amplifiers of the unit 121 according to the embodiment of FIG. 6. The maximum dispersion for each band is limited while the total band of operation is broad and is not confined by the resultant power loss.

The advantage of the solution is that it allows an alignment between amplifiers over a broad frequency band which makes it possible to use amplifiers placed in parallel in multichannel applications, a solution which opens up many opportunities for flexible useful loads.

In addition, the use of a larger number of phase-shifters and attenuators causes an impact in terms of weight, consumption and cost which remains perfectly acceptable.

The invention claimed is:

1. An amplification device for a satellite in order to amplify a plurality of n transmission channels to an output corresponding to a beam, the device comprising:
    a frequency band combining means comprising n inputs in order to receive the n transmission channels and q outputs in order to supply respectively the channels grouped together within q frequency bands,
    a power amplification means including p amplifiers in parallel for distributed amplification of the n channels,
    a gain and phase adjustment means corresponding to the p amplifiers on the q frequency bands.

2. The device as claimed in claim 1, wherein the distribution of the transmission channels in q frequency bands and the use of the p amplifiers induces the need to use at least q*p phase-shifters/attenuators for their individual adjustment.

\* \* \* \* \*